Feb. 19, 1924.

J. R. YOUNG

WHEEL

Filed Feb. 14, 1922

WITNESSES

INVENTOR
J. R. Young,

BY
ATTORNEYS

Feb. 19, 1924.
J. R. YOUNG
WHEEL
Filed Feb. 14, 1922

WITNESSES

INVENTOR
J. R. Young,
BY
ATTORNEYS

Patented Feb. 19, 1924.

1,484,106

UNITED STATES PATENT OFFICE.

JOHN RUTHERFORD YOUNG, OF AKRON, OHIO.

WHEEL.

Application filed February 14, 1922. Serial No. 535,593.

*To all whom it may concern:*

Be it known that I, JOHN R. YOUNG, a citizen of the United States, and a resident of Akron, in the county of Summit and State of Ohio, have invented certain new and useful Improvements in Wheels, of which the following is a specification.

This invention relates in general to an improvement in wheels and more particularly to an improvement in wheels of the type embodying a demountable rim.

The object of the invention is to provide a wheel of this character which may be constructed of wood and metal and which is of light weight and yet strong and durable, and easy and comparatively inexpensive to manufacture.

Another object is to provide an improved wheel of this character wherein the demountable rim may be readily mounted on or taken from the wheel and in which the demountable rim when arranged on the wheel is positively supported throughout its entire circumferential extent and has positive driving connection with the fixed rim of the wheel.

Other objects and advantages of the invention reside in certain novel features of construction, combination and arrangement of parts which will be hereinafter more fully described and particularly pointed out in the appended claims, reference being had to the accompanying drawings forming a part of this specification, and in which, Figure 1 is a view in side elevation illustrating the preferred embodiment of the invention, one of the clamps being omitted in order to show the notch, Figure 2 is a plan view of the wheel with the rim thereof and the tire removed, Figure 3 is a fragmentary view in plan of the fixed rim of the wheel showing one of the bolts and a driving saddle in position, Figure 4 is a fragmentary view in side elevation, a portion of the clamp being broken away for the sake of illustration.

Figure 1:
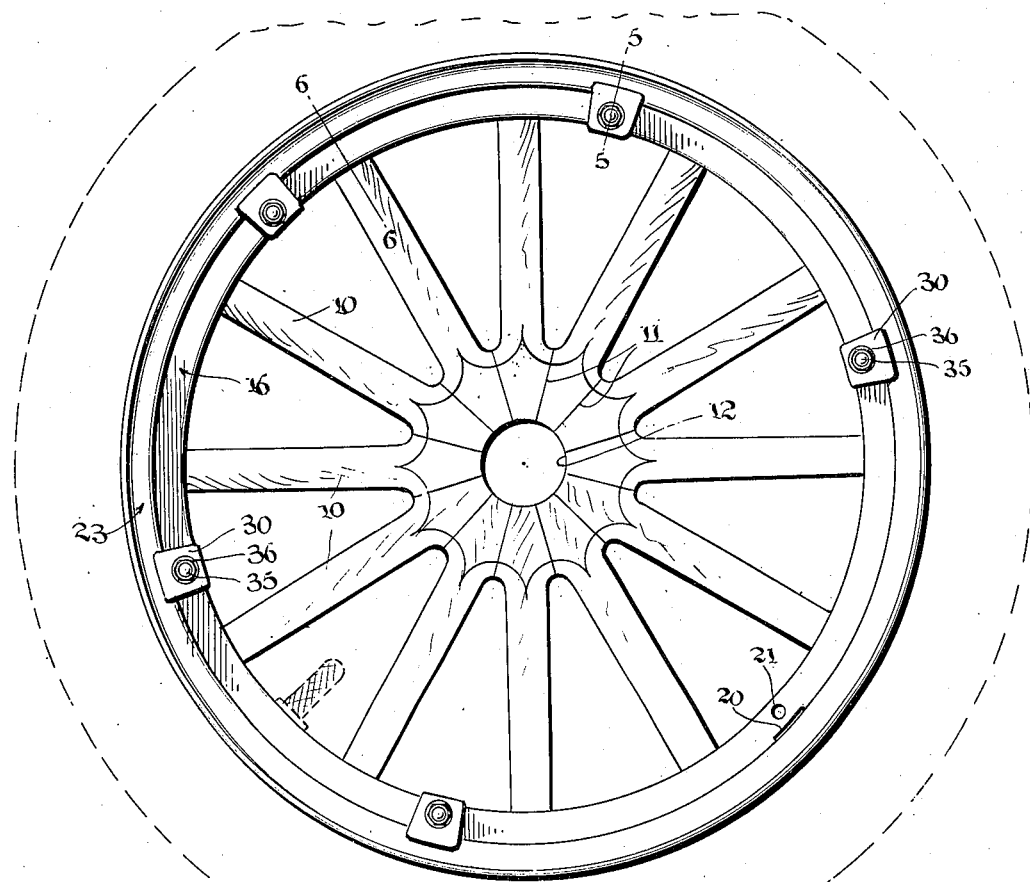
Figure 2:
Figure 3:
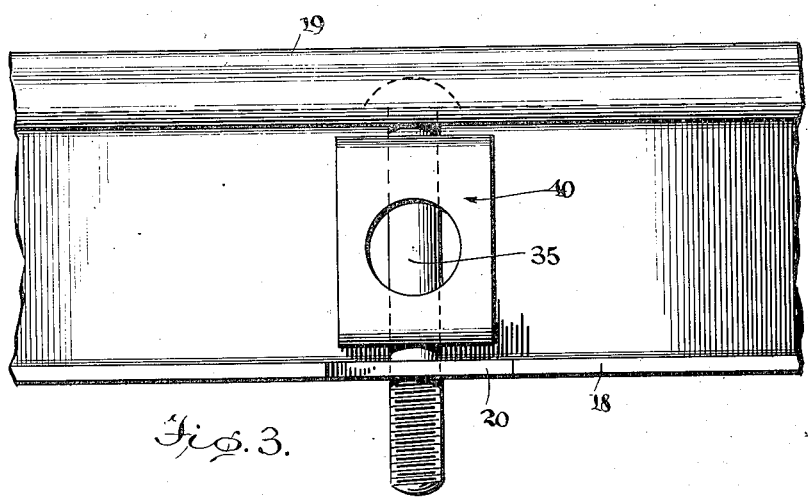
Figure 4:
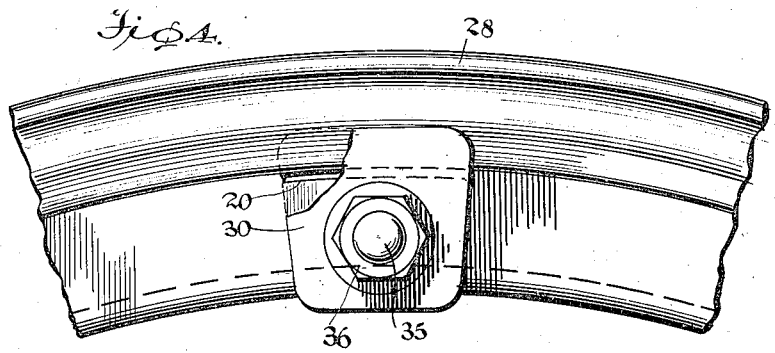
Figures 5, 6:
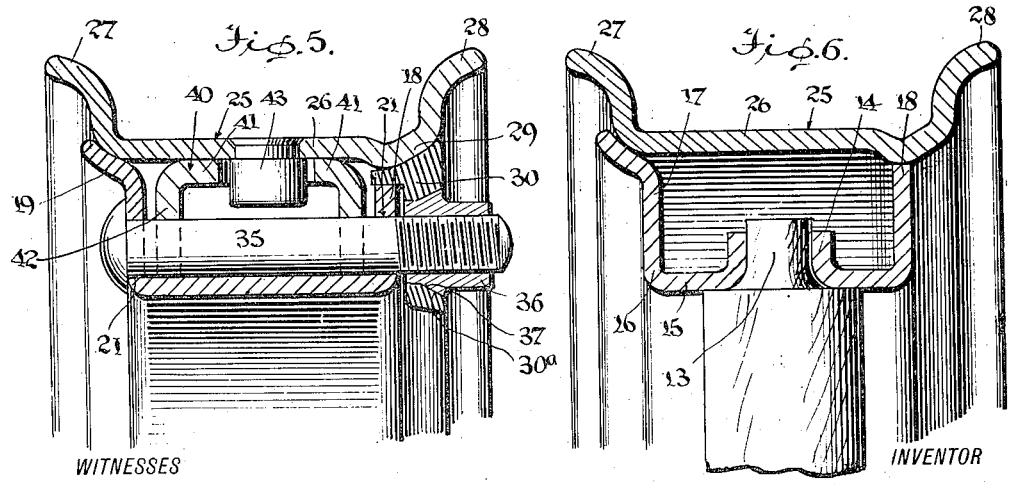
Figure 5 is a view in transverse section on line 5—5 of Figure 1.
Figure 6 is a similar view on line 6—6 of Figure 1.

Referring to the drawings wherein for the sake of illustration is shown the preferred embodiment of the invention, it will be seen that the wheel comprises a plurality of wooden spokes designated at 10. The spokes 10 have their inner ends mitred as at 11 and these mitred ends are joined or in engagement to form the hub of the wheel which is indicated at 12. The outer ends of the spokes have tenons 13 (see Figure 6) formed thereon and received or seated in sockets 14 formed in the base section 15 of a fixed rim which is designated generally at 16. The fixed rim 16 is constructed of resilient metal and the sockets 14 are pressed from the base section thereof. In assembling the fixed rim with the spokes, it is subjected to pressure in order to compress it to position on the spokes and with its sockets 14 receiving the tenons 13.

The fixed rim 16 includes an inner side flange 17 and an outer side flange 18, the inner side flange having integrally formed therewith an inclined shoulder 19 and the outer side flange having formed therein a plurality of circumferentially spaced arcuate notches 20. A set of bolt holes or openings 21 is provided in the side flanges 17 and 18 adjacent each notch 20.

A demountable rim designated generally at 25 is provided and includes a base section 26 and tire retaining flanges 27 and 28. Around its inner side the demountable rim is supported on the shoulder 19 of the fixed rim and around its outer side and adjacent the outer tire retaining flange 28 the demountable rim has a circumferential bead or shoulder 29 rolled or pressed therefrom and supported on the top of the flange 18 of the channel-shaped fixed rim except at the points where the notches 20 occur, and at these points the bead 29 is engaged by clamps 30 which enter the notches and engage the shoulder or bead 29. Bolts 35 are arranged in the bolt holes 21 and have threaded on their outer ends nuts 36, the nuts 36 having conical heads 37 engaging conical recesses 30ª in the clamps 30 and forcing the clamps into clamping engagement with the demountable rim. Preferably the bolts 35 have a driving fit in the openings 20 so as to be rigidly held in position at all times.

A driving connection is provided between the fixed rim and the demountable rim and serves to preclude relative circumferential movement between the fixed rim and the demountable rim and operates to positively impart the motion of the fixed rim to the demountable rim and vice versa. Preferably this driving connection comprises a saddle designated generally at 40, and including a body portion 41 having bifurcated legs 42 embracing the adjacent bolt 35, the body portion 41 being apertured and the apertured body portion receiving a lug 43 secured to the base section of the demountable rim.

In use, when it is desired to take the demountable rim from the wheel, the nuts 36 are disconnected from the bolts 35 and the clamps 30 may then be disengaged from the demountable rim, at which time the demountable rim may be slid laterally from the fixed rim, the driving saddle being suitably slotted to permit the lugs 43 to partake of this movement, it being noted that the only function of the driving saddle 40 and the lugs 43 is to prevent relative circumferential movement of the demountable rim and fixed rim, the clamps 30 serving to lock the demountable rim against lateral movement. When the demountable rim is to be mounted on the wheel it is first positioned thereon with its lug 43 received in the aperture or opening of the driving saddle 40. The clamps 30 are next entered into the notches 20 and when the clamps are so disposed the bolts 35 extend through them. The nuts 36 are then threaded on the bolts 35 and the conical heads 37 of the nuts 36 coact with the conical recesses 38 of the clamps to properly center these parts and when the nuts 36 have been turned home the demountable rim is securely and positively supported and locked in position on the fixed rim of the wheel.

What I claim is:—

1. In a wheel of the character described, a fixed rim of channel form, a demountable rim arranged on the fixed rim, releasable fastening means for securing the demountable rim in position on the fixed rim, and including bolts extending transversely through the channel of the fixed rim, and a driving connection between the fixed rim and the demountable rim and including a driving saddle having bifurcated lugs embracing one of said bolts and an apertured body portion engaging the under side of said demountable rim, and a lug secured to the underside of the demountable rim and fitted in the aperture of said driving saddle.

2. In a wheel of the character described, a fixed rim of channel form including side flanges, the outer side flange having a plurality of circumferentially spaced and arcuate notches, the side flanges having a set of bolt holes adjacent each of said notches, a demountable rim seated on said fixed rim, clamps cooperable with the notches of the fixed rim and engageable with the demountable rim, bolts extending through said bolt holes, nuts threaded on said bolts and engaging said clamps, and driving connections between the fixed rim and the demountable rim including a driving saddle having bifurcated legs embracing one of said bolts, and an apertured body portion engaging said demountable rim and a lug fixed to the demountable rim and received in the aperture of said driving saddle.

JOHN RUTHERFORD YOUNG.